Feb. 27, 1923. 1,447,088.
B. KERR.
SHOCK ABSORBER.
FILED JUNE 8, 1920.
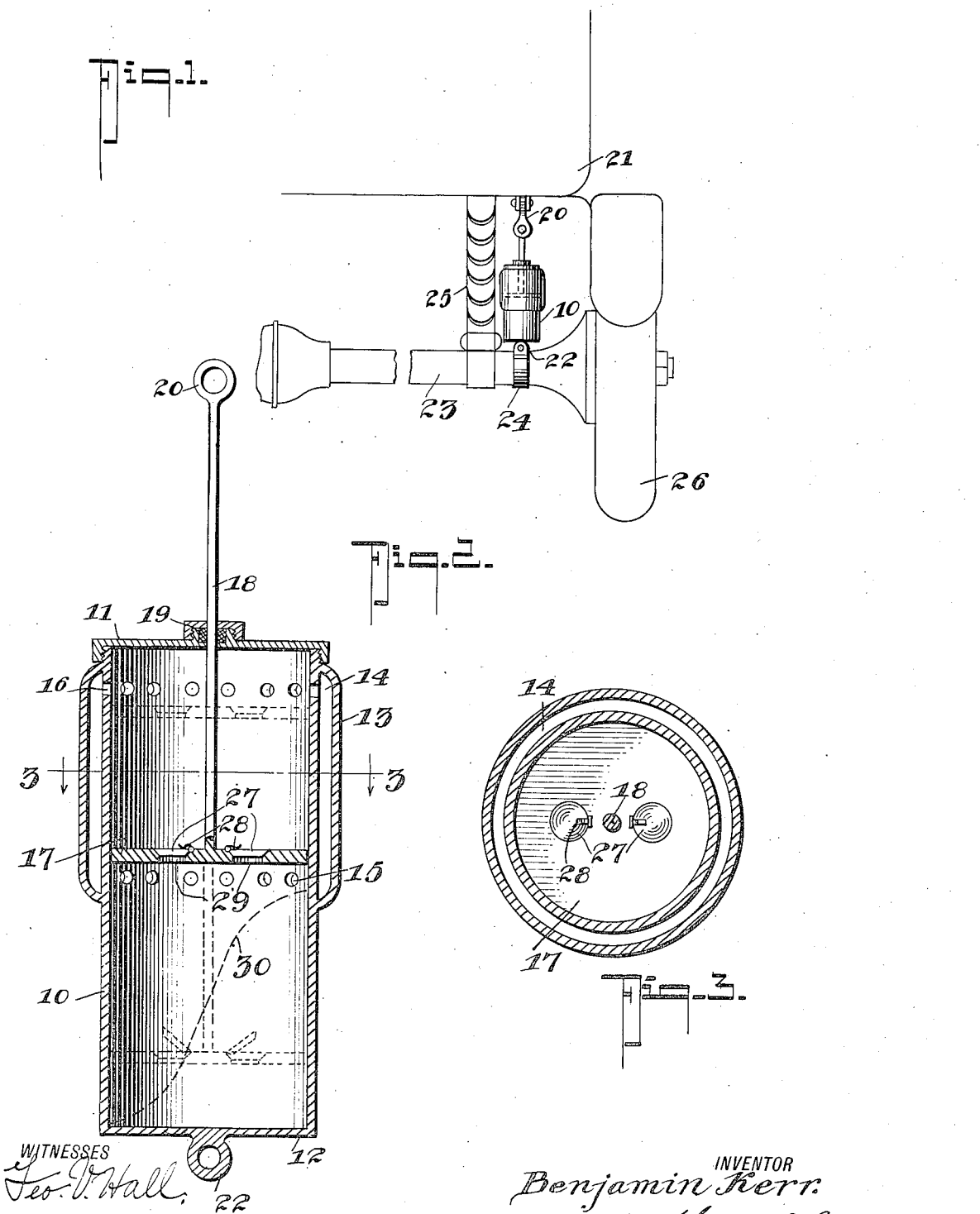
INVENTOR
Benjamin Kerr.

Patented Feb. 27, 1923.

1,447,088

UNITED STATES PATENT OFFICE.

BENJAMIN KERR, OF SARNIA, ONTARIO, CANADA.

SHOCK ABSORBER.

Application filed June 8, 1920. Serial No. 387,289.

*To all whom it may concern:*

Be it known that I, BENJAMIN KERR, a subject of the King of Great Britain, and a resident of Sarnia, in the Province of Ontario, Dominion of Canada, have invented certain new and useful Improvements in Shock Absorbers, of which the following is a specification.

This invention relates to an improved shock absorber or fluid cushion adapted primarily for use in connection with automobiles or other vehicles, in order to absorb shocks and reduce the play between the body and running gear, especially of the rear axle and housing of an automobile, incident to the travel over uneven road surfaces.

It is an object to provide a simple, inexpensive and thoroughly reliable device of the above character which will absorb shocks and prevent quick jerky and violent movements upward to the body, thus insuring comfort to the occupants.

A further object of the invention is to provide a shock absorber, cushioning or controlling device which is operated under suitable fluid pressure, such as air, and adapted to be secured between any portions of a vehicle connected with springs and particularly the vehicle frame and its axle, or the body and axle housing, so as to control the action of the vehicle springs whereby to allow the springs to be compressed with a very small amount of resistance and to absorb shocks due to the recoil action in passing over protuberances or depressions in a road.

Other and further objects of my invention will become readily apparent to persons skilled in the art, from a consideration of the following description, taken in conjunction with the accompanying drawings, wherein:—

Figure 1 is a fragmentary rear elevation showing my improved shock absorber and vehicle spring controller applied to an automobile at one side.

Figure 2 is an enlarged vertical longitudinal sectional view centrally of the cushioning device or shock absorber, and Figure 3 is a horizontal sectional view taken on the line 3—3 of Figure 2 and looking downwardly in the direction indicated by the arrows.

Referring to the drawings in detail, in which like reference characters designate corresponding parts throughout the several views, my improved shock absorber and vehicle spring controller is shown as embodying a cylinder 10 having closed top and bottom end walls 11 and 12 and provided around its upper portion with a concentric outer wall 13 producing an annular channel or by-pass 14 therebetween. The concentric outer wall 13 which is spaced from the wall of the cylinder proper, has its ends curved toward and formed integrally with the cylinder 10 or otherwise secured thereto. Its lower end terminates at or about the medial point in the length of the cylinder and its upper end terminates a short distance from the upper end of the cylinder as indicated at 14.

Immediately above the lower end of the wall 13, the cylinder 10 is provided with a series of apertures or ports 15 serving to establish communication between the channel or by-pass 14 and the interior of the cylinder or cylinder chamber, said by-pass or passage 14 being connected with the interior of the cylinder or chamber at the top portion of said annular channel or by-pass and immediately below the top edge of the wall 13, through the medium of a series of openings or ports 16, preferably corresponding in number and size, as well as location, to the apertures or ports 15 and made of the proper size, according to the stroke of the piston within the cylinder, as will be hereinafter described, and the length of the cylinder and type of automobile to which the device is applied.

Working within the cylinder 10 is a piston or plunger 17 having a piston rod 18 operable through a stuffing box or gland 19 at the cap or upper end of the cylinder and provided with an eye or loop 20 at its upper or free end designed for universal-joint connection with the vehicle body or other portion 21 of a vehicle desired to be controlled, as clearly shown in Figure 1 of the drawings. One end of the cylinder is preferably made removable, the cap being so shown in the drawings and the lower end having an attaching means consisting of an eye or jaws 22 for universal-joint connection with the rear axle housing 23 as through the medium of a clamp 24. As illustrated in Figure 1, the vehicle body is designated at 21 and to this body or to the frame of the automobile or other vehicle, the spring 25 is secured, the spring in the present instance having its free extremity secured to the rear axle housing for use in conjunction with the cushioning device or shock absorber, so that as the wheels, designated at 26, pass over uneven road surfaces, the shock will be absorbed and the action of the spring controlled in preventing recoil and jarring of the occupants.

As before mentioned, the piston 17 operates in the cylinder 10 and the latter may contain suitable fluid, such as air or other non-freezing fluid, and is provided with a pair of upwardly opening flap or other type of valves 27, normally held closed by springs or the like 28 to close the apertures 29, preferably formed with beveled seats 30 to conform to the valves which are hinged at their inner edges, as clearly shown in the drawings.

In the operation of the device, when the parts are attached as described and the piston is moving downwardly in the cylinder, the valves 27 will freely open, as indicated in dotted lines in Figure 2 of the drawings, and the fluid may pass freely to the upper portion of the cylinder so that the body may move downwardly relative to the rear axle or the rear axle may move upwardly relative to the body, comparatively free and without extraordinary resistance. However, during the first part of the movement of the piston downwardly, the air in front of the same will escape through the apertures or ports 15, and into the annular chamber or passage 14, and thence through the openings or ports 16 in the interior of the cylinder at the top. After the piston passes over the apertures 15 in the lower portion of the cylinder, the air will escape only through the openings 29 the valves 27 being open as during the first part of the movement. However, when the rear axle moves downward relative to the body, or the body moves upwardly as in the recoil action, with respect to the rear axle, as the vehicle is traveling over uneven road surfaces, in striking a protuberance or a depression or rut, the piston will move upwardly in the cylinder and valves 27 will automatically close, increasing the resistance in front of the piston. During this upward movement, the resistance will be such that the velocity curve or parabola will be represented by the dash line 30 in Figure 2 at the lower part of the cylinder. Beginning at the bottom, it will be seen that the resistance, due to the fact that the springs must create motion to the load they sustain, at first is considerable and then the resistance decreases toward the intermediate portion, but increases owing to compression and vacuum toward the top of the curve immediately in front of the apertures 15, so as to produce a graduating effect which cushion corresponds at the top and bottom. After the piston passes the apertures 15, the fluid or air compressed in front above the piston will escape through the apertures or ports 16 and into the annular chamber or bypass 14 and then through the apertures or ports 15 in the lower part of the cylinder. By this means, the resistance offered to the upward movement of the piston will be considerably reduced and the body may move upwardly comparatively freely with respect to the axles, or the axles in striking an obstruction, may move upwardly in the same manner with respect to the body. By this means, the action of the spring will be efficiently controlled, so as to prevent a violent recoil, which as is well known, results in considerable jarring and discomfort to the occupant of the car.

I am aware that there are several somewhat similar devices consisting of cylinder and piston, some with the upper end of the cylinder enlarged, grooved and the like, but I am not aware that any of these devices produce the same result as in the present device, particularly in the lower end of the cylinder as the piston is traveling upwardly, and when the fluid in front of the piston cannot escape past the same and there is a tendency to form a vacuum in the lower part and compression above. Of course, after the piston passes by the apertures or ports 15, the cushion is relieved by the fluid passing through the passages 16, through the by-pass or channel 14 and beneath the cylinder, communication with the interior of the cylinder or chamber at the opposite sides of the piston being established by this means. That is, in the downward movement of the piston, a free motion is given from the top to the bottom and in the upward movement, the motion is first retarded, assuming that the piston has descended below the lower row of holes or apertures, owing to the fact that a momentum must be given to the body it is raising. The velocity gradually increases to about midway of the cylinder in the lower part thereof, when the compression of air in the upper part begins to take effect and retards the motion gradually until it reaches the lower row of holes or apertures, which is its normal position when loaded. The piston in its upward movement passing the holes or apertures permits air to pass from the by-pass or channel 14 to the lower end of cylinder and releases the compression and normal conditions exist, so that the piston may move freely to a point near the top of the cylinder where an air cushion is formed, considering that the valves 27 are closed and that the compression is relieved through the by-pass and apertures or ports. Of course, when the valves are open, the downward movement of the piston is practically free and there is little or no cushioning effect or resistance. The latter movement allows the piston to move downwardly more freely, and allows the automobile or vehicle gear to move upwardly, or the wheels to drop into depressions in the road surface, without transmitting jar or shock to the body or occupants. In this manner, pitching movement of the automobile or body thereof, is greatly reduced and the working parts of the machine somewhat protected against working loose. Of course, it will be understood that when the springs are suddenly compressed, the amount of energy stored up or conserved in them, is greater than that required to return the load to normal position. In the return movement, part of such energy is consumed in returning the load to normal position, the balance being absorbed in the compression of the air in the upper portion of the cylinder. This produces the necessary cushioning action to avoid violent recoil such as would otherwise occur, and in this manner, the action of the spring is efficiently controlled.

In view of the foregoing, it is thought that the operation of the device will be readily understood and in view of the simplicity and practical value thereof, it will commend itself to those skilled in the art.

However, above the apertures or ports 16, the cylinder 10 is closed, thus producing an air chamber or cushion when the piston moves upwardly, to prevent the piston striking the top of the cylinder.

I claim :—

1. In a device of the character described, a cylinder, means associated with the cylinder and cooperating therewith to provide a by-pass communicating at one end with the interior of the cylinder adjacent to the upper end of the latter and communicating at its other end with the interior of the cylinder intermediate of the length of the latter, an apertured piston operating within the cylinder, and valve means controlling the passage of a fluid through the piston.

2. A shock absorber and cushioning device for regulating the action of a vehicle spring, comprising a cylinder, a piston operable therein having a plunger adapted to be connected to a part to be cushioned, means for attaching the lower end of the cylinder to an axle housing, an annular chamber around the cylinder near the upper portion thereof and having communication with the interior of the cylinder near the upper and lower ends of said annular chamber, said cylinder projecting above the upper end wall of the chamber whereby to limit the upward movement of the piston and form a cushion so that the fluid is prevented from escaping in front of the piston and whereby the piston is prevented from contacting with the upper end of the cylinder, and means for controlling the passage of fluid from one side of the piston to the other within the cylinder.

3. The combination with a vehicle spring having a free end portion attached to a rear axle and a vehicle body or frame or part to be cushioned; of a spring regulating device comprising a cylinder having means at the lower end thereof for clamping the same to the axle housing, a piston operable in the cylinder and having a piston rod connected to the body, a cap on the cylinder through which said piston rod operates, said cylinder having a row of ports therethrough at or near its transverse center and near its upper end, a circumscribing concentric wall around the cylinder and forming a channel therebetween through which channel communication is established with the interior of the cylinder at opposite sides of the piston at times, said piston having apertures therethrough, valves normally closing said apertures and adapted to open upwardly on the downward movement of the piston but to close upon upward movement of the piston to produce a cushion, the velocity of the piston varying, being first relatively slow, next relatively quick, and then increasingly slow to a medial point of the cylinder, said cushion being relieved after the piston passes beyond the lower row of apertures and during the movement thereof in the upper portion of the cylinder.

BENJAMIN KERR.